(12) United States Patent
Cutlip et al.

(10) Patent No.: US 7,313,568 B2
(45) Date of Patent: Dec. 25, 2007

(54) GENERATING AND ANALYZING BUSINESS PROCESS-AWARE MODULES

(75) Inventors: Robert R. Cutlip, Cary, NC (US); Neeraj R. Joshi, Morrisville, NC (US)

(73) Assignee: International Business Machines Corporation, Armonk, NY (US)

(\*) Notice: Subject to any disclaimer, the term of this patent is extended or adjusted under 35 U.S.C. 154(b) by 524 days.

(21) Appl. No.: 10/814,775

(22) Filed: Mar. 31, 2004

(65) Prior Publication Data

US 2005/0223020 A1 Oct. 6, 2005

(51) Int. Cl.
*G06F 17/30* (2006.01)
(52) U.S. Cl. .................... 707/102; 707/3; 709/223
(58) Field of Classification Search .......... 707/1–10, 707/100–104.1; 709/223
See application file for complete search history.

(56) References Cited

U.S. PATENT DOCUMENTS

| | | | |
|---|---|---|---|
| 6,438,269 B1 | 8/2002 | Kim et al. | |
| 6,457,143 B1* | 9/2002 | Yue | 714/43 |
| 6,470,287 B1 | 10/2002 | Smartt | |
| 6,804,714 B1* | 10/2004 | Tummalapalli | 709/224 |
| 6,914,883 B2* | 7/2005 | Dharanikota | 370/230.1 |
| 2002/0156756 A1 | 10/2002 | Stanley et al. | |
| 2002/0156792 A1 | 10/2002 | Gombocz et al. | |
| 2002/0198858 A1 | 12/2002 | Stanley et al. | |

FOREIGN PATENT DOCUMENTS

WO  WO01/33395 A2  5/2001

OTHER PUBLICATIONS

Claterbos, Chris, "Oracle9*i* Business Intelligence Beans: Making the Move", Oracle® Technology Network, 2004, printed Mar. 31, 2004, <http://otn.oracle.com/oramag/webcolumns/2003/techarticles/claterbosonbibeans.html?_template=/otn/content/print> (6 pages).
Claterbos, Chris, "Oracle9*i* Business Intelligence Beans: Making the Move (Continued)", Oracle® Technology Network, 2004, printed Mar. 31, 2004, <http://otn.oracle.com/oramag/webcolumns/2003/techarticles/claterbosonbibeans_pt2.html?_template=/otn/content/print> (3 pages).

(Continued)

*Primary Examiner*—Mohammad Ali
*Assistant Examiner*—Sangwoo Ahn
(74) *Attorney, Agent, or Firm*—Marcia L. Doubet; Andre M. Gibbs

(57) ABSTRACT

Techniques are disclosed for efficiently analyzing measurement data for business processes (for example, in a service provider environment). Business process-aware modules or "cubes" are created from the measurement data, using features of a spatially-enabled database system. A "drill-down" approach is provided for investigating underlying information for a cube (including lower-level linked cubes). Data types other than cubes, such as planes from which a cube is constructed, may also be analyzed. The disclosed techniques may be used to provide autonomic systems, which are self-aware, at a business process level. That is, based on results of analyzing data represented by a cube, autonomic adjustments may be made. In a service provider environment, the analysis and/or the autonomic adjustments may be directed toward enabling the service provider to avoid jeopardizing commitments in service level agreements (and the revenue loss that may result when the commitments are not met).

13 Claims, 13 Drawing Sheets

OTHER PUBLICATIONS

Gonzales, Michael L., et al., "The OLAP-Aware Database", DB2® Magazine, Oct. 2, 2003, printed Nov. 5, 2003, <http://db2mag.com/db_area/archives/2003/q2/gonzales.shtml> (9 pages).

"Offering Catalogue, DB2 Cube Views (5724-E15,", IBM Corporation, May 13, 2003, printed Nov. 5, 2003, <http://www-3.ibm.com/common/ssi/OIAccess.wss?DocURL=http://d03xhttpc1001g.boulder.ibm.com/common/ssi/rep_oc/b/83e3b903d0b502f187256d220013a5bb/index.html&InfoType=OC&InfoSubType=null&InfoDesc=Offering+Catalogue&panelurl=paneltext=> (4 pages).

"DB2 Cube Views", IBM Corporation, 2003, printed Nov. 5, 2003, <http://www-3.ibm.com/software/data/db2/db2md/features.html> (3 pages).

Crain, I.K. et al., "Representation of Spatial Objects In a Three-Dimensional GIS", Canadian Conference on GIS-91, Ottawa, Mar. 18-22, 1991, Proceedings, National Conference, pp. 558-570.

\* cited by examiner

FIG. 1

| | OLAP | Geospatial Iceberg Cube |
|---|---|---|
| Definition: | algorithm + data structures = program | algorithm + data structures = autonomic program |
| Composed of: | matrix | spatial cube |
| | record | data point, line, or polygon |
| | bitmap | spatial objects |
| | Solves problems that are unknown | Solves problems which are known or anticipated |
| | Units of measure similar at different levels | Units of measure may differ at different levels |

FIG. 4

400 — Probes P = { a,b,c,d,e,f,g,h }
410 — KPI = {$\Delta$ca, $\Delta$cb, $\Delta$dc, $\Delta$fd, $\Delta$fe, $\Delta$gd, $\Delta$ge, $\Delta$hd, $\Delta$he, $\Delta$at, $\Delta$bt, $\Delta$et} (t = initial time)
420 — Collaboration C = {(S1, A1), (S2, A1), (S2, A1), (A1, A2), (A2, A3), (S3,A3), (S1,A1, A2), (S2,A1, A2), (A1,A2,A3) ... }
430 — Service Offering SO = {((S1,A1)(A1,A2)), ((S2,A1)(A1,A2)), ((S2,A1)(A1,A2)(A2,A3)), ...}

GENERATING AND ANALYZING BUSINESS PROCESS-AWARE MODULES

BACKGROUND OF THE INVENTION

1. Field of the Invention

The present invention relates to computer programming, and deals more particularly with techniques for evaluating gathered measurement data pertaining to business processes, where a result of this evaluation may be used (for example) to provide autonomic management in service level management systems (where the autonomic management may be in terms of objectives pertaining to customer service level agreements).

2. Description of the Related Art

Service level agreements, or "SLAs", are commonly used by service providers to define their contractual service obligations to their customers. For a network service provider, these service obligations typically include network response time commitments, whereby the customer is guaranteed that requests for various types of network-accessible services will be completed within some average elapsed time and/or within some maximum elapsed time. Service obligations also typically include availability commitments for resources (including network-accessible services). If the service obligations are not met, the customer might be entitled to compensation such as a reduction in the fees owed to the service provider. Service providers are therefore highly motivated to meet the commitments in their SLAs.

Service level management techniques are not limited to use with providers of network services. In general, any type of business process may be subject to an SLA. For example, if a supplier provides widget components to be used by a widget assembler, the widget assembler may place constraints on maximum allowable delivery time between sending an order for widget components to the supplier and receiving the ordered widget components. As another example, an SLA between the widget component supplier and assembler might specify a maximum percentage of the supplied widget components that can be defective without violating the SLA.

Data pertaining to various business processes in the system must be collected in order to determine whether SLA commitments are being met. The term "service level management system", or "SLMS", is used herein to refer generally to a collection of elements or components that are organized for carrying out a business process at some level. In a network service provider environment, for example, the elements typically comprise a number of hardware and/or software elements that enable customers to use network-accessible services. The term "measurement data" is used herein in a general sense to refer to the data collected in an SLMS for evaluation of monitored business processes.

It is desirable to use collected measurement data to make predictions about future system behavior. Without accurate predictions for demand and processing load, for example, service providers are often forced to choose between providing excess capacity when provisioning resources for their customers or refunding fees when the provisioned capacity is unable to meet the SLA commitments.

Much attention has been given in recent years to development of autonomic computing techniques, whereby the maintenance and administrative complexity inherent in information technology ("IT") systems and networks can be reduced by employing algorithms that allow the systems and networks to not only monitor themselves, but to take corrective actions when anomalies are detected. An autonomic system is commonly defined as one which displays one or more of the following characteristics: (1) self-defining; (2) self-configuring; (3) self-optimizing; (4) self-healing; (5) self-protecting; (6) anticipatory; and (7) contextually aware in a heterogeneous environment. (These concepts are known in the art; accordingly, a detailed description thereof is not deemed necessary to an understanding of the present invention.)

The interaction among business processes can be complex. Evaluating the business processes to determine whether SLA commitments (or similar objectives) are being met is complex as well. What is needed are techniques for analyzing business processes in an efficient manner.

SUMMARY OF THE INVENTION

An object of the present invention is to provide techniques for analyzing business processes in an efficient manner.

Another object of the present invention is to provide techniques for leveraging spatial database technology for analyzing information in service level management systems.

A further object of the present invention is to accurately predict near-term outlook for processes monitored by a service level management system.

A further object of the present invention is to enable SLA commitments to be achieved, preferably while avoiding the expensive and inefficient over-commitment of resources.

Yet another object of the present invention is the application of iceberg cube concepts (which are known in the art to be applied to online analytical processing systems) to spatial database management systems.

A further object of the present invention is to provide techniques for improved service level management systems that leverage commercially-available database systems.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be provided as methods, systems, and/or computer program products. In one aspect, the present invention provides techniques for using geospatial operations to analyze an SLMS, comprising: collecting a plurality of measurements pertaining to the SLMS; constructing geospatial objects from the collected measurements; and using the constructed objects as input to geospatial operations. Preferably, the geospatial operations are provided by a spatially-enabled database system, and the constructed objects preferably include 2-dimensional planes and 3-dimensional cubes.

In another aspect, the present invention provides techniques for using spatially-enabled operations to evaluate 3-dimensional objects, comprising: obtaining a plurality of measurements; building a plurality of 2-dimensional planes by associating selected ones of the measurements; building one or more 3-dimensional cubes from a plurality of the 2-dimensional planes; and enabling evaluation of at least one of the one or more 3-dimensional cubes using geospatial operations of a spatially-enabled system. The measurements are preferably stored in the spatially-enabled system. The 2-dimensional planes and/or the 3-dimensional cubes may be stored in the spatially-enabled system.

In either aspect, the measurements may pertain to business processes, and may measure interactions among business partners. The cubes may represent measurements for a plurality of service offerings in an SLMS. Each plane may represent measurements for a plurality of collaborations among entities in an SLMS, and each measurement may represent a key process indicator used to measure service in the SLMS. Preferably, the measurements are directed to evaluating conformance to service level agreements in the SLMS.

A drill-down approach may be used, whereby more detail pertaining to a cube can be obtained by evaluating one or more of the planes from which it was built, and similarly, more detail pertaining to a plane can be obtained by evaluating one or more of the measurements from which it was built.

The present invention will now be described with reference to the following drawings, in which like reference numbers denote the same element throughout.

BRIEF DESCRIPTION OF THE DRAWINGS

FIG. 1 provides a comparison of prior art online analytical processing techniques with features of geospatial iceberg cubes of the present invention;

FIG. 4 lists probes, key process indicators, collaborations, and service offerings found in the sample environment of FIG. 3;

FIG. 5, comprising

FIG. 6, comprising

FIG. 7, comprising

Figure 2:
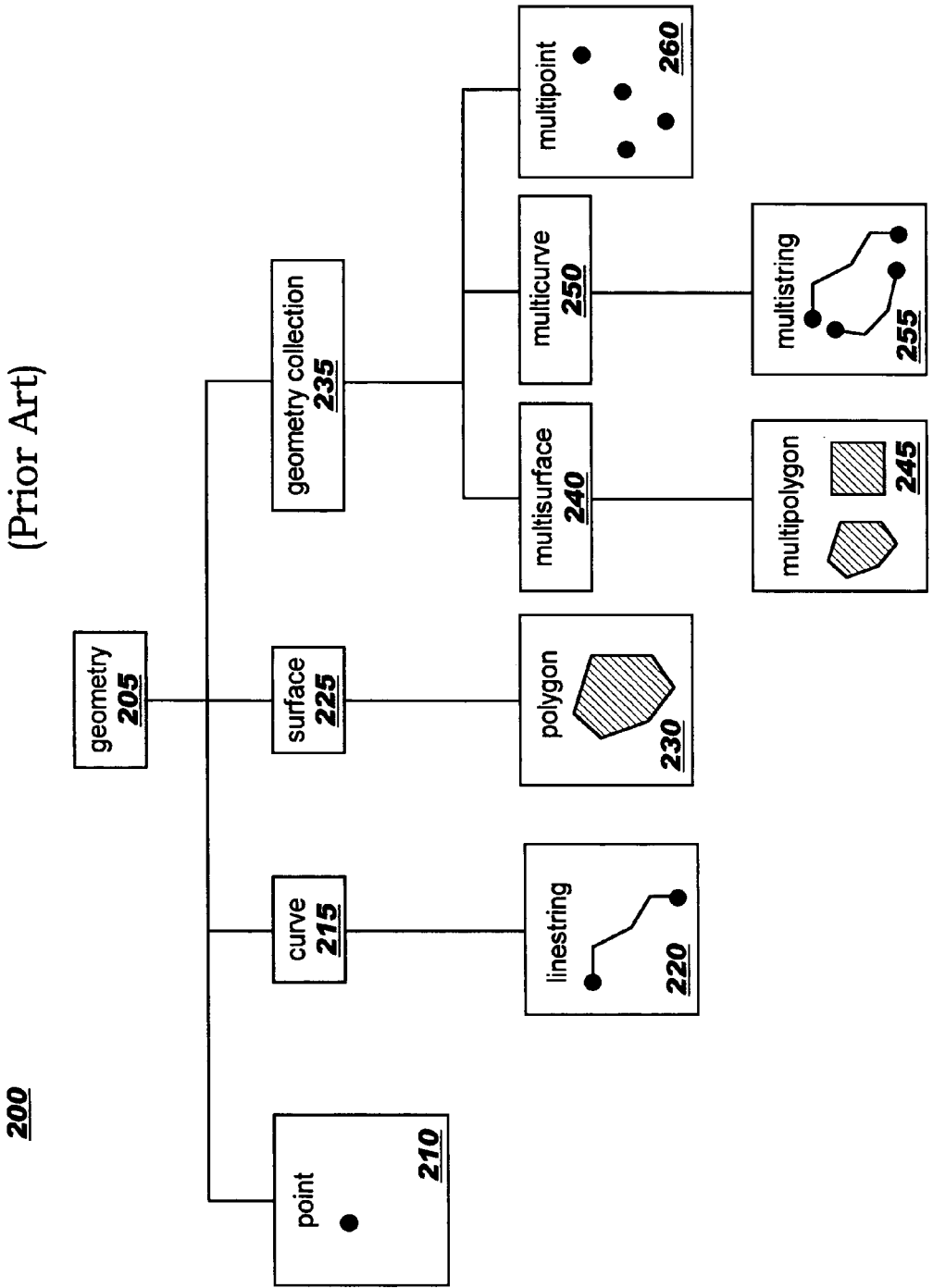
FIG. 2 illustrates a common geometric model used by spatially-enabled database systems, according to the prior art.

DESCRIPTION OF PREFERRED
EMBODIMENTS

The present invention provides techniques for efficiently analyzing measurement data for business processes, where this data may be gathered in a service level management system. Business process-aware modules referred to herein as "cubes" are created from the measurement data, and in preferred embodiments, these cubes are simple, lightweight, and short-lived, thereby incurring minimum processing overhead. These cubes may also be referred to as "iceberg cubes", in that they provide a summary view of more-detailed underlying information; a "drill-down" approach is provided for investigating that underlying information where necessary.

Evaluating the iceberg cubes created according to preferred embodiments provides a capability for autonomic systems, which are self-aware, at a business process level. That is, using results of evaluating the iceberg cubes, an SLMS can be provided with information about itself, such as the current state of business processes and the near-term outlook for those processes. Autonomic adjustments may then be made, if necessary, and the service provider may thereby avoid jeopardizing SLA commitments (and the revenue loss that typically results when the commitments are not met).

The present invention exploits metadata that is created pertaining to operation of an SLMS and its monitored processes. In preferred embodiments, this abstracted metadata includes, but is not limited to, one or more of the following:

(1) a service level agreement repository which contains currently-applicable SLAs;

(2) measurement data which contains information abstracted from a catalog of measured events or processes (that is, events or processes that are monitored for determining SLA compliance; the term "processes" is used hereinafter when discussing what is being measured), including probes of business collaborations (i.e., collaborations among a business and its suppliers, customers, business partners, and so forth); and (3) other available sources of pertinent metadata. These may include, but are not limited, to: (a) user data that may reside in various directory structures, such as an LDAP directory database; (b) service information, which might reside (for example) in registries such as Universal Description, Discovery, and Integration (or "UDDI") registries; (c) data within a service offerings catalog; and/or (d) billing metadata.

Typically, service providers structure their services into several different service levels or tiers, where customers can choose to pay a higher rate to obtain commitments for a higher level/tier of service. (Hereinafter, the term "level" is used when referring to this aspect of SLA commitments, to avoid confusion with the term "tier" that is used for a different purpose when discussing the cubes.) For example, a service provider might offer a "platinum level" service, a "gold level" service, and a "silver level" service, where the platinum level is the most expensive and offers advantages such as a commitment to faster response time than is available in the gold level (which in turn is faster than the silver level), or fewer outages than the gold and silver levels, and so forth. It may happen that a few different service levels are offered, or a large number of service levels may be offered in some environments. In some environments, the levels of service may be structured as some number of "premium" levels and some number of "basic" levels. Accordingly, when analyzing measured processes, preferred embodiments enable considering a plurality of service levels.

Preferred embodiments combine concepts from Online Analytical Processing (commonly referred to as "OLAP") with concepts of Object-Relational Database Systems (commonly referred to as "ORDB") that have been geospatially enabled. (A geospatially-enabled ORDB is also referred to herein as a spatially-enabled database system, for ease of reference.) Functions, stored procedures, and data types provided in spatially-enabled database systems are leveraged by preferred embodiments to produce lightweight cubes, and to perform quick and efficient analysis of data represented by those cubes. Preferably, this analysis is carried out at a business process level, such that the resulting information can be used for improving business process operation.

Measurement data is used to form cube structures within a spatially-enabled database system or systems, where these cube structures represent various aspects of the monitored business processes, according to preferred embodiments. These cube structures are also referred to herein as geospatial iceberg cubes or, equivalently, as geospatial cubes, where these terms may be defined as a graphical representation of data (e.g., service level management data) in multiple dimensions leveraging relational spatial structures. One or more reference objects is programmatically created, according to preferred embodiments, representing objectives for measurement data at a particular level of service. For example, a reference cube may be used that represents service objectives of a platinum service level, and another reference cube may be used to represent the gold service level. These reference objects are also referred to herein as "comparative objects" or "boundary objects", and may be structured as cubes or elements thereof (such as planes). Comparative objects may be redefined or modified programmatically (e.g., when SLA commitments are changed). In preferred embodiments, cubes containing measurement data are linked or interrelated to one another, thereby facilitating efficient drill-down; comparative objects may be linked or interrelated in this manner as well. In addition to, or instead of, building the comparative objects to represent objectives pertaining to SLAs, the comparative objects can be based on other factors such as feedback information from other systems (including historical data) and/or input from an administrator of the SLMS. (For example, the administrator might be queried for parameter values such as a desired upper and lower bound on response time for each of the levels of service, and a reference object may then be constructed from these input values.)

Before describing techniques of the present invention in more detail, background information will be provided for several topics.

OLAP is well known in the art, and enables analyzing complex data to derive business intelligence. OLAP systems typically allow users to navigate between high-level summary and lower-level or "drill-down" detailed data. As one example, OLAP techniques may be used to analyze sales information of a business enterprise. Executives of the business may wish to have a number of different views of the same underlying sales data, perhaps to detect trends or predictive factors, project future revenue, and so forth. The sales data might be computed with reference to selected products, selected customers, selected distribution channels, and a particular time period, for example. This data might be further evaluated in terms of actual vs. projected figures. Or, breakdowns might be performed based on distribution channel. And, instead of selecting a subset of products, customers, distribution channels, etc., the analysis might be performed over all available data pertaining to the business enterprise. Many other types of analysis may also be performed, as will be obvious. The factors used in the analysis (such as which products to consider, which customers to consider, and so forth) are commonly referred to as the "dimensions" of the analysis, and an analysis involving two or more dimensions is commonly referred to as a "multidimensional analysis".

FIG. 1 provides a comparison of OLAP systems of the prior art and geospatial iceberg cubes of the present invention. As shown therein, an OLAP program is comprised of algorithms and data structures, whereas a program used with a geospatial iceberg cube is also comprised of algorithms and data structures but may now be an autonomic program (that is, a program that uses results of analyzing one or more cubes to autonomically modify system behavior). OLAP systems typically use matrices, records, and bitmaps for data storage, whereas geospatial iceberg cubes of the present invention use spatial cubes (i.e., cube structures and operations available in prior art spatially-enabled database systems); data points, lines, and/or polygons; and possibly other spatial objects.

OLAP systems are commonly used to solve problems that are unknown, while the geospatial iceberg cubes disclosed herein are preferably used to solve problems that are known or anticipated (such as evaluating where bottlenecks are found in a system of business processes; what processes lead to SLA commitments not being met; and predicting what business processes should therefore be modified). Finally, FIG. 1 illustrates that OLAP systems use units-of-measure that are similar at different levels, whereas the units-of-measure in geospatial iceberg cubes may differ among the various levels (for example, the cube's x-axis may represent the various levels of service offered by the service provider, while the y-axis may represent deviation from measurement objectives and the z-axis may represent points of time in a time interval).

Systems are known in the art for using object-relational databases to process (e.g., store and access) data using geometric data types. When an object-relational database is adapted for use with geometric data types, the database is often referred to as "spatially-enabled", and data or objects created using these data types may be referred to as "spatial data" or "spatial objects". (Generally, spatial objects may be considered as a form of object representation within relational database systems.) In a spatially-enabled database, the geometric data types are based on a geometric model expressed in terms of geometric shapes or objects. In addition to physical entities, spatial data may also represent relationships among objects, as well as measurements or distances pertaining to objects. As an example of relationships among objects, spatial data may be used to determine whether a geometric shape corresponding to the location of a particular bridge intersects a geometric shape corresponding to the location of a river (thus determining whether the bridge crosses the river). As an example of using spatial data for measurements or distances, the length of a road passing through a particular county could be determined using the geometric object representing the road and a geometric object which specifies the boundaries of the county.

Typical spatially-enabled database systems support a set of basic geometry data types and a set of more complex geometry data types, where the basic types comprise points, line strings, and polygons, and the complex types comprise collections of points, collections of line strings, and collections of polygons.

A common geometric model used by spatially-enabled database systems is shown in FIG. 2. As shown therein, the model is structured as a hierarchy or tree having geometry 205 as its root, and having a number of subclasses. Point 210, linestring 220, and polygon 230 represent the basic geometry data types. In this model 200, linestring 220 is a subclass of curve 215, and polygon 230 is a subclass of surface 225. Geometry collection class 235 is the root of a subtree representing the more complex geometric data types, and each subclass thereof is a homogeneous collection. Multipolygon 245, multistring 255, and multipoint 260 represent the collections of polygons, line strings, and points, respectively. Multipolygon 245 is a subclass of multisurface 240 in this model, and multistring 255 is a subclass of multicurve 250. Only the classes which are leaves of this tree 200 (i.e., 210, 220, 230, 245, 255, and 260) are instantiable in typical spatially-enabled database systems; the other nodes correspond to abstract classes. (Each of these entities is an actual data type.)

Referring now to the basic data types in particular, geometric data according to the model 200 of FIG. 2 may be expressed in terms of a single point having (x,y) coordinates, or may be described as a line string or a polygon. A line string may be considered as one or more line segments which are joined together, and is defined using an ordered collection of (x,y) coordinates (i.e., points) that correspond to the endpoints of the connected segments. A polygon is defined using an ordered collection of points at which a plurality of line segments end, where those line segments join to form a boundary of an area.

Many different examples may be imagined where points, line strings, and polygons can be used for describing locations or areas. A point might represent the location of a landmark such as a house or a building, or the intersection of two streets. A line string might be used to describe a street, or the path of a river or power line, or perhaps a set of driving directions from one location to another. A polygon might be used to describe the shape of a state or city, a voting district, a lake, or any parcel of land or body of water.

Once spatial information has been stored in a database, the database can be queried to obtain many different types of information, such as the distance between two cities, whether a national park is wholly within a particular state, and so forth.

As one example of a spatially-enabled database, a feature known as "Spatial Extender" can be added to the DB2® relational database product of International Business Machines Corporation (hereinafter, "IBM") to provide support for geometric data types. Spatial Extender provides support for the geometric data types shown in FIG. 2, and provides a number of built-in functions for operating on those data types. When using Spatial Extender, spatial data can be stored in columns of spatially-enabled database tables.

Preferred embodiments of the present invention leverage a DB2® object relational database system in which the Spatial Extender feature has been installed to provide spatial data support. (An implementation of the present invention may leverage another database system which provides analogous support, without deviating from the scope of the present invention.) Refer to "IBM® DB2® Spatial Extender User's Guide and Reference", Version 7.2, published by IBM as IBM publication SC27-0701-01 (July 2001), for more information on Spatial Extender. This User's Guide is hereby incorporated herein as if set forth fully. ("IBM" and "DB2" are registered trademarks of IBM.) A DB2 object relational database system with the Spatial Extender feature is an example of the spatially-enabled database systems referred to herein.

Using the features of a spatially-enabled database system, for example, two planes can be compared to each other by invoking built-in functions. According to preferred embodiments of the present invention, planes are constructed from measurement data, and a collection of these planes forms a cube. Storing this data in a spatially-enabled database system (implementations of which are commercially available, as just discussed) provides a number of advantages. Existing data normalization and data management features of the relational database technology in the spatially-enabled database management system can be leveraged, thereby improving efficiency. The spatial extensions, geometric data types, grid indexing functions, user-defined functions, and/or built-in procedures of the database system can also be used. In this manner, operations on the stored data can use optimized built-in functions of the database system, rather than requiring an applications programmer to provide complex code in his/her application for interacting with the gathered measurement data used by preferred embodiments. As a result, programmer efficiency is increased and code complexity is reduced, thereby leading to decreased program development and support costs. (Furthermore, use of the optimized built-in database functions for interacting with the stored measurement data will typically increase the efficiency of other application programs and search utilities that may access this data.)

Figure 3:
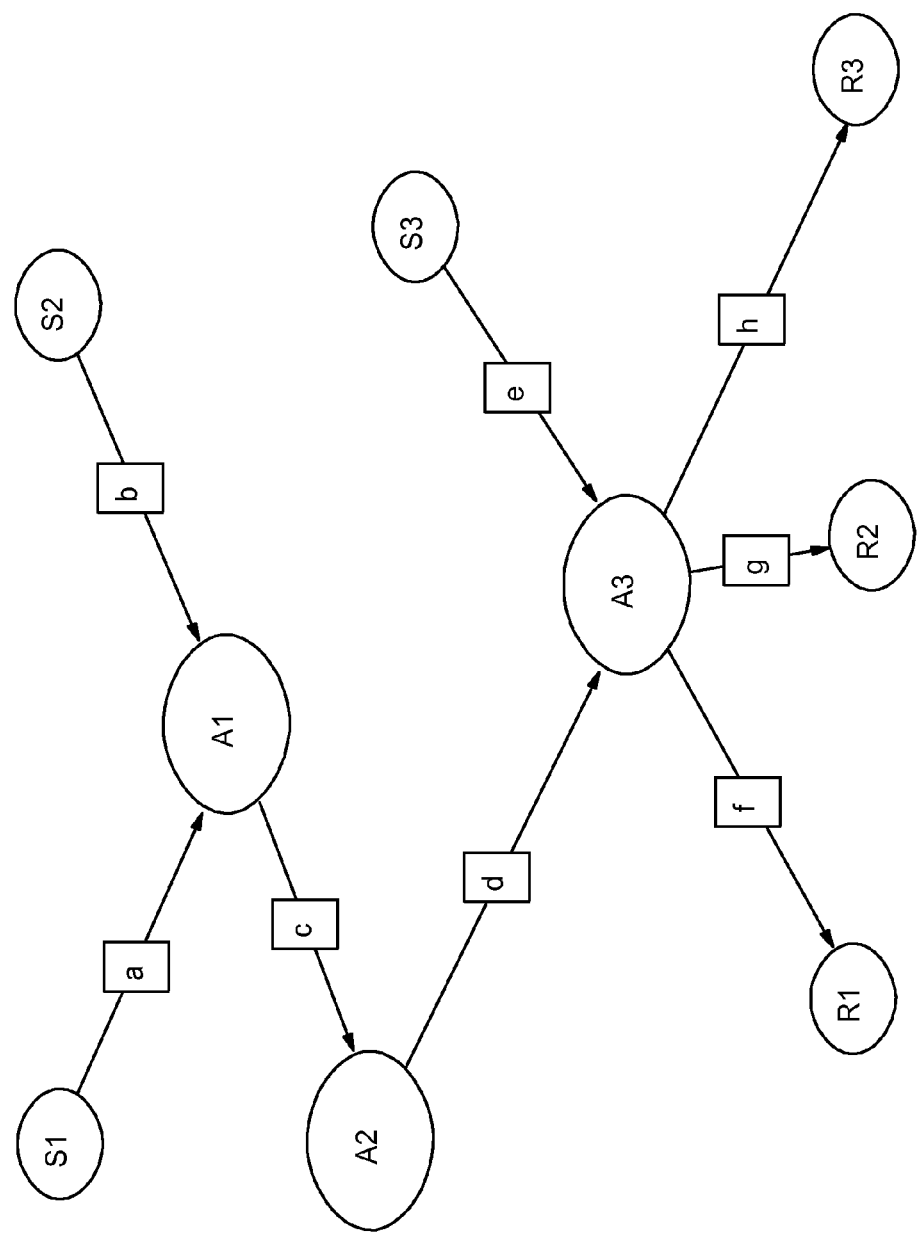
FIG. 3 depicts a sample environment that is used to illustrate operation of preferred embodiments.

FIG. 3 depicts a sample environment in which the present invention may be used advantageously. This figure illustrates business process interactions between suppliers, assemblers, and retailers (and these business process interactions may be considered as forming a higher-level business process). Suppliers "S1" and "S2" provide raw materials to assembler "A1", in this example. Probes "a" and "b" are inserted on the links that join these entities, where the probes are used to monitor interactions and measure various data. According to preferred embodiments, probes are initially provided on all links of interest that join two or more entities (where a "link of interest" is a place in a particular business process that is deemed to be important for measurement purposes); the number of probes may later be programmatically adjusted, as will be described in more detail below, if desired. The probes may use automated techniques for monitoring and measurement taking, but embodiments of the present invention may also use data captured by non-automated probes (e.g., by humans who record business process measurements that can then be stored in a spatially-enabled database). The data measured by one of these probes "a" or "b" may include, for example, factors such as how long a process takes to complete. The elapsed time between sending an order to "S1" and receiving the ordered materials might be measured on behalf of "A1", for example. Or, in a network service provider environment, a probe may be provided for measuring time required to respond to a client's request for service and so forth. The type of measurements to be taken by probes will depend on the business processes deployed in the environment and may vary widely among implementations of the present invention, as will be obvious, and the manner in which the probes operate does not form part of the present invention. The data measured by the probes can be used, according to preferred embodiments, when determining whether SLA commitments have been met. (Alternative embodiments of the present invention may evaluate data represented by geospatial cubes for purposes not related to SLA commitments, without deviating from the scope of the present invention.)

FIG. 3 further illustrates that assembler "A1" provides materials to another assembler "A2", and a probe "c" measures data pertaining to business processes between these entities. Yet another assembler "A3" receives materials from assembler "A2" and from supplier "S3", and operations between these entities are measured by probes "d" and "e", respectively. In this example, assembler "A3" distributes completed goods to three retailers "R1", "R2", and "R3", and probes "f", "g", and "h" measure business processes between these entities.

A number of terms used herein to describe preferred embodiments will now be defined in more detail.

Key process indicator, or "KPI": This term is used herein to generally signify a measurement that is representative of a business process, or a factor that is measured for a business process. The time required to complete an action may be a KPI in a time-sensitive business process. For example, with reference to FIG. 3, one KPI may be the time required by "S1" to deliver its raw materials to "A1" after "A1" initiates its order for those materials.

Collaboration: Collaboration can be thought of as a "macro process" (i.e., a collection of one or more processes) composed of one or more KPIs. The time it takes for a particular collaboration to occur may be computed, in appropriate scenarios, as the sum of the KPIs which make up that collaboration. (There may also be scenarios in which the summation of all KPIs is not appropriate. For example, if the collaboration includes processes that operate concurrently, then another approach, such as adding the longest of the concurrent processes, may be preferable.) With reference to FIG. 3, for example, a collaboration may be defined as including delivery of materials from "S1" to "A1" and forwarding materials from "A1" to "A2".

Service Offering, or "SO": A service offering is a group of one or more collaborations. Thus, providing completed goods to retailer "R1" in FIG. 3 may be considered as a service offering that includes all the processes whereby materials are delivered to "A3" and the process whereby "A3" delivers the completed goods to "R1". A particular collaboration may be a member of one or more service offerings.

A number of data collections are used with preferred embodiments, and these collections are preferably stored in tables of a spatially-enabled database. The collections include mappings and SLA values. For the mappings, tables are preferably provided for: (1) probe-to-KPI mappings; (2) KPI-to-collaboration mappings; and (3) collaboration-to-service offering mappings. (These three tables or collections are referred to as "collections 1, 2, and 3", respectively, when discussing the flowcharts in FIG. 8.)

For the SLA values, tables are preferably provided for recording: (4) SLA values for each KPI; (5) SLA values for each collaboration; and (6) SLA values for each service offering. (These three tables or collections are referred to as "collections 4, 5, and 6", respectively, when discussing the flowcharts in FIG. 8.) These three SLA tables preferably store threshold values, such as a threshold on maximum allowable time for a KPI(x) that measures a business process, a threshold on maximum allowable time for a collaboration comprised of a collection of KPIs, and a threshold on maximum allowable time for a service offering comprised of a collection of collaborations, respectively. Furthermore, more than one threshold will typically be associated with each KPI, collaboration, and service offering. That is, a first threshold might be allowable for KPI(x) for customers in the platinum service level, while a second threshold pertains to this KPI for customers in the gold service level and a third threshold pertains to this same KPI for customers in the silver service level.

The three tables of mappings used by preferred embodiments can be consulted, for example, when determining whether there has been a failure of an SLA commitment. The probe-to-KPI mappings preferably indicate, for a particular KPI, which probe provides input to be used with that KPI, and conversely, for each probe, which KPI uses measurements taken by that probe. (According to preferred embodiments, the probe-to-KPI mappings are one-to-one.) The KPI-to-collaboration mappings preferably indicate, for a particular KPI, which collaboration(s) that KPI is associated with, and conversely, for a particular collaboration, which KPI(s) are used to measure that collaboration. For example, the collaboration between supplier "S1" and assembler "A1" might be measured by one KPI pertaining to the time it takes for "S1" to fill an order from "A1" and also by another KPI that pertains to the percentage of defective items per order. In this example, the (S1, A1) collaboration is mapped to two KPIs.

The collaboration-to-service offering mappings preferably indicate, for a particular collaboration, which service offerings include that collaboration and conversely, for each service offering, which collaborations form part of that service offering.

FIG. 4 shows a list 400 of the probes contained in the example environment in FIG. 3, a list 410 of KPIs that might be used in this environment, a list 420 of collaborations that might be used when evaluating business processes in this environment, and a list 430 of service offerings that might be evaluated. (Note that lists 420 and 430 are not intended to be exhaustive.)

The list 400 of probes simply contains one entry for each probe. The list 410 of KPIs uses a notation "$\Delta(probe_{destination} probe_{source})$" for representing a KPI that measures elapsed time, from a starting point prior to the link monitored by "$probe_{source}$" through the link monitored by "$probe_{destination}$". Thus, for example, "$\Delta(ca)$" represents the time that elapses when supplier "S1" sends materials to assembler "A1" (as measured by probe "a") and "A1" then forwards materials or goods to assembler "A2" (as measured by probe "c"). As a special case in this notation, "t" represents an initial time, and therefore the KPI "$\Delta(et)$" represents the time that elapses when supplier "S3" sends materials to assembler "A3" (as measured by probe "e"). As another example, the notation "$\Delta(c-ab)$" might be used to represent only the time that elapses between a starting time when assembler "A1" receives materials from both S1 and S2 (as measured by probes "a" and "b", respectively) and an ending time when materials or goods are then forwarded from "A1" to "A2". In other words, only the elapsed time measured by probe "c", on the link between "A1" and "A2", is included for the KPI "$\Delta(c-ab)$". The number and type of KPIs to be created may vary widely among implementations of the present invention, and in list 410, KPIs have not been constructed for every possible combination of flows. For example, it might be desirable to construct a KPI such as "$\Delta(ga)$", representing a duration of time from when supplier "S1" provides materials as input to the process, up through and including when retailer "R2" receives a product that has made its way through the system under evaluation. A KPI may be defined for any process of interest in a particular system, and alternative ways of defining and representing KPIs may be used in an embodiment of the present invention without deviating from the inventive techniques disclosed herein.

The list 420 of collaborations uses a notation "( $N_1$, $N_2$, ... )", where each "$N_x$" represents a node at the end of a connected link on a path between two or more nodes. So, for example, the collaboration "(S1,A1)" represents the link between supplier "S1" and assembler "A1" (on which probe "a" is located), and the collaboration "(A1,A2,A3)" represents a path comprising the link between assemblers "A1" and "A2" and also the link between assemblers "A2" and "A3" (on which probes "c" and "d" are located, respectively).

The list 430 of service offerings uses a notation "(($N_a$, ..., $N_m$)($N_m$, ..., $N_z$))", where each "$N_x$" represents a node at the end of a connected link, "$N_a$" is the initial node of a collaboration that spans a path to node "$N_m$", and this node "$N_m$" is in turn the initial node of a collaboration that spans a path to a destination node "$N_z$". So, for example, the service offering "((S1,A1)(A1,A2))" represents the path (which is simply a single collaboration, in this case) between supplier "S1" and assembler "A1" and continuing on to include the path/collaboration that starts at assembler "A1" and ends at assembler "A2".

In preferred embodiments, each KPI, each collaboration, and each service offering is associated with at least one threshold that is based on an SLA. Where multiple different levels of service are provided (e.g., platinum, gold, etc.), then each KPI, collaboration, and service offering is typically associated with a different threshold for each of these levels of service. With reference to collaborations, for example, if the number of failures for a particular collaboration exceeds a certain value (where this value is normally specified in the SLA), then the SLA commitment has not been met and the customer is typically due for some type of compensation. (Owing a reduced fee to the service provider is one type of compensation that might be applicable.) When a collaboration measurement pertains to a unit of time, then a collaboration failure may be a collaboration that fails to complete within the prescribed time limit. The thresholds for each KPI, each collaboration, and each service offering are preferably stored in the previously-discussed tables that were referred to above when discussing "collections 1-6".

More than one service offering can be associated with an identical group of collaborations, in which case each of the service offerings will typically use a different SLA value for a tolerance parameter. As an example, an SLA in a service offering for a platinum service level customer might contain a threshold of 0.1 percent collaboration failures for a group of collaborations, while the SLA in a service offering for a gold or silver level customer might specify a threshold of 0.5, and 1.0 percent, respectively, for the same group of collaborations.

Figure 5B:
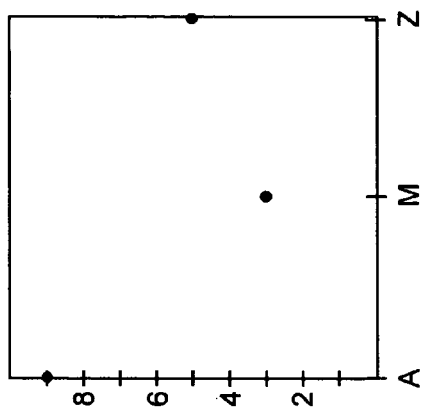
FIGS. 5A-5C, illustrates a sample "first-tier" cube and several sample planes from this cube, according to preferred embodiments.
Figure 5C:
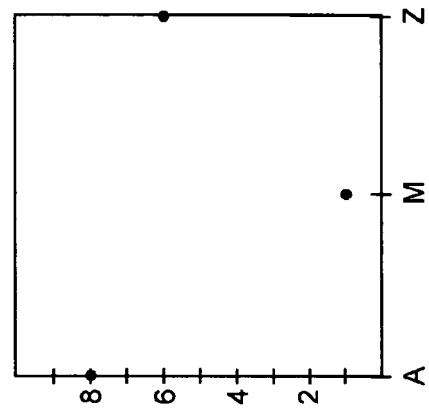
Figure 5A:
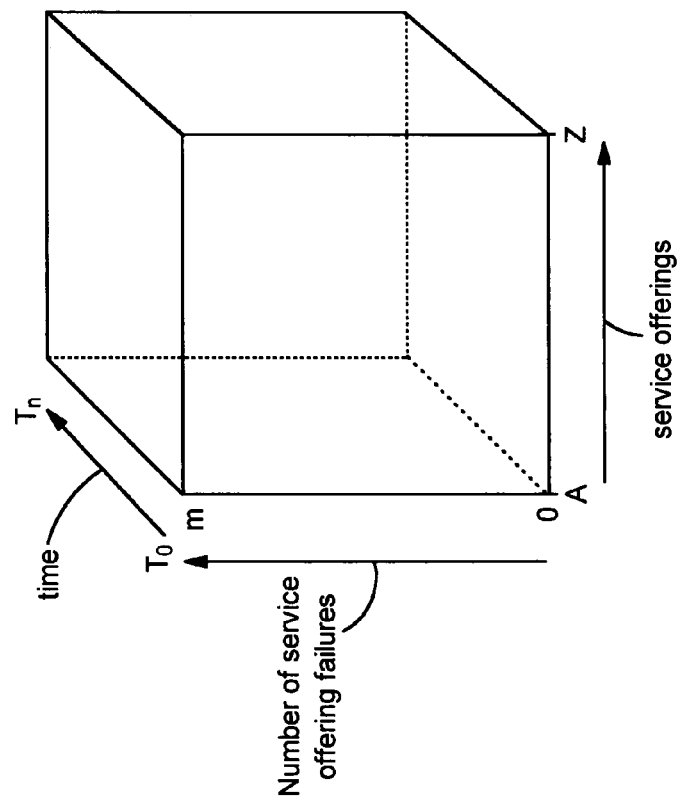

Turning now to FIGS. 5-7, several sample cubes that illustrate operation of the present invention will be described. In FIG. 5A, a cube referred to herein as a "first-tier cube" is depicted. This first-tier cube represents service offering failures over time (i.e., the number of times the set of commitments represented by the service offering was not met; see the discussion above of "collection 6", which contains SLA commitments per SO), for each of the different service offerings. For example, the front or (x,y) plane of the cube represents service offerings "A" through "Z", each of which is graphed on the x-axis, and the number of failures in each of these service offerings, where the number of failures is graphed on the y-axis. See FIG. 5B, which presents a sample plane for these service offerings at a time $T_1$, and FIG. 5C, which presents a sample plane showing the failures in these same service offerings at another time $T_2$. In these sample planes, SO "A" had 9 failures at time $T_1$ and 8 failures at time $T_2$; SO "M" had 3 failures at time $T_1$ and 1 at time $T_2$; and SO "Z" had 5 failures at time $T_1$ and 6 at time $T_2$. Thus, the collection of planes representing SO failures from time $T_0$ through $T_n$ form the complete first-tier cube shown in FIG. 5A.

The cube in FIG. 5A is a high-level cube, as compared to the cubes in FIGS. 6 and 7, in that it provides a high-level abstraction of data. This high-level cube can be used to determine failures at a given point in time, as well as failure trends over time. In preferred embodiments, the collection of planes is created over a relatively short interval (on the order of hours, preferably). In addition, each plane from a cube may represent measurements taken over a shorter time interval (which is necessarily shorter than the time interval represented by the cube), in which case the points in each of the (x,y) planes will represent a summation over that shorter time interval.

By constructing the cube as an object that leverages features of a spatially-enabled database, values represented in the cube can be compared, using built-in functions of the spatially-enabled database (which is adapted for making comparisons among objects including lines, planes, and cubes), to a reference object or boundary object. A reference object may be structured as a geospatial cube, for example; or, reference objects may be built as spatially-enabled planes or other spatially-enabled data types. For example, a reference object might contain a first plane that graphs, for a particular start-up or break-in phase, the maximum number of allowable service offering failures in each of SO "A" through "Z"; another plane in the reference object, corresponding to a later point in time, might then illustrate reductions in the maximum number of collaborations to which a customer can subscribe. Thus, SO "A" might be a silver level service, SO "B" might be a gold level service, and so on.) Or, as another example, when the service offerings pertain to a network service provider, one plane might correspond to the number of SO failures that can be tolerated during a particular time of day when the network is expected to be lightly loaded, while another plane might correspond to the number of SO failures that can be tolerated at a different time of day when the network is congested. And, it may happen in some environments that the tolerance values in the reference cube decrease for "premium" service levels and, at the same time (i.e., within the same plane), increase for "basic" service levels.

It may be desirable to use planes from a cube to evaluate trends over time. For example, a plane extending along the (y,z) axes for service offering "A" can be evaluated to determine the number of SO failures for this particular SO at each of the time intervals $T_0$ through $T_n$. If desired, a line string can be constructed from the points representing the number of failures for this SO at each point $T_x$ in the time interval. Using features of a spatially-enabled database system, this line string can be compared to a reference line string that represents the maximum number of allowable failures for this SO (if the SO provides for time-variant SLA commitments). Or, each of the points representing the number of failures at some time interval can be compared to a reference point (e.g., if the SO has a fixed point as its SLA commitment value). Refer to the discussions of FIGS. 6 and 7, below, where further examples are provided in terms of evaluating various planes from a geospatial cube.

Discussions herein are primarily in terms of ensuring that service is "good enough" to meet commitments. However, evaluations performed using embodiments of the present invention may be directed not only toward detecting failures to achieve SLA commitments, but also to areas where SLA commitments have been exceeded. That is, as a matter of good business practice, it may be desirable to not only avoid giving service that is "too bad" (meaning that the customer is unhappy and/or is entitled to a rebate or other compensation), but also to avoid giving service that is "too good". Service that is "too good" arises when a customer receives a level of service beyond what the customer paid for. For example, if the customer pays for silver level service but achieves results falling within the parameters of platinum level service, then the service provider is effectively "giving away" its higher-level service. In addition to lost revenue opportunities for the service provider, this situation may cause customers at the higher levels of service to become dissatisfied, even though their SLA commitments are met, if they learn that other customers also receive this higher level of service without paying its higher price. Thus, while discussions herein are primarily in terms of evaluating when measurements do not rise to the level in an SLA commitment, it will be obvious in view of the teachings herein how embodiments may also, or alternatively, be used to evaluate whether measurements have been exceeded in the opposite sense.

Using the present invention, a "drill-down" approach can be used whereby a first-tier cube is evaluated for anomalies or larger-than-desirable deviation from expectations—such as a larger number of failures than is desirable in the service offerings at some particular time, or a failure trend, over time, that is not desirable. Or, having even a single SO failure in the cube may be sufficient to trigger a drill-down. Drill-down refers to evaluating a lower-level cube, which in this case is a "second-tier cube". A second-tier cube provides information about failures in the set of collaborations that make up a selected one of the service offerings for which more information (i.e., the drill-down processing) is desired. Similarly, to investigate a particular one of the collaborations from a second-tier cube, the drill-down approach can be used to evaluate what is happening with the KPIs in that particular collaboration. (A "third-tier cube" is used for KPI data, as discussed in more detail below with reference to FIG. 7.) As will be obvious from this discussion, if it is desirable to further investigate the collaborations in more than one service offering from the first-tier cube, a second-tier cube can be created that represents the collaborations in each of these service offerings of interest, and similarly, multiple third-tier cubes can be created when it is desirable to investigate the KPIs in more than one of the collaborations represented in a particular second-tier cube.

Figure 6A:
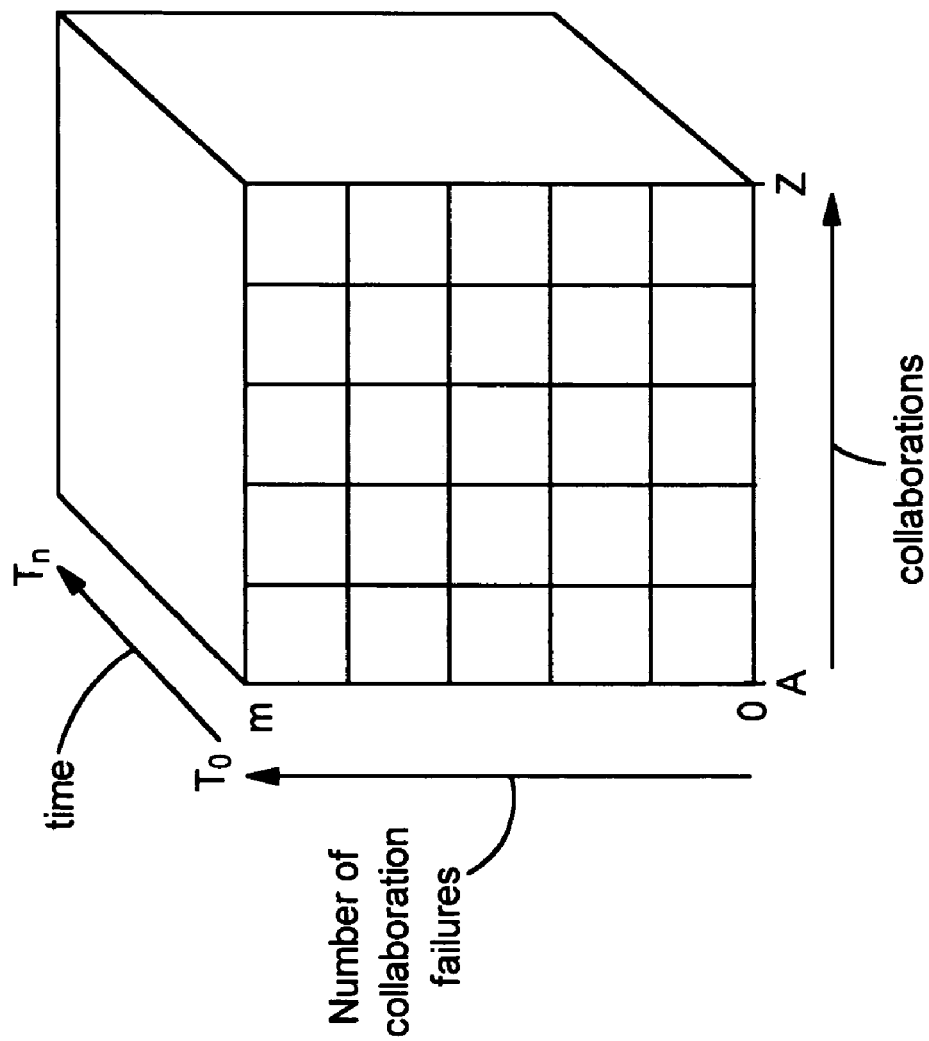
FIGS. 6A-6D, illustrates a sample "second-tier" cube, interrelationships between this cube and a sample reference cube, and sample planes from the reference cube.

FIG. 6A shows a second-tier cube that represents collaboration failures over time, for each of the different collaborations (where, in preferred embodiments, these collaborations correspond to one of the service offerings represented by the higher-level cube in FIG. 5A). For example, the front plane of the cube in FIG. 6A represents collaborations "A" through "Z" (which should not be confused with the service offerings "A" through "Z" from FIG. 5A), each of which is graphed on the x-axis, and the number of failures in each of these collaborations, where the number of failures is graphed on the y-axis. A sample plane presenting the number of failures in each of the collaborations at a time $T_x$ and another sample plane showing failures of those same collaborations at a different time $T_y$ can be constructed (in a similar manner to constructing planes for SO failures over time, as has been described above with reference to FIGS. 5B and 5C), and by collecting such planes over an interval of time $T_0$ through $T_n$, the second-tier cube shown in FIG. 6A is created.

As with the cube in FIG. 5A, the cube in FIG. 6A can be used to determine failures at a given point in time, as well as failure trends over time, and the cube is preferably constructed from a collection of planes created over a relatively short time interval. The second-tier cube can then be compared to a second-tier reference cube and/or other reference objects. This second-tier reference cube is preferably constructed in a similar manner to the first-tier reference cube, except that the second-tier reference cube contains planes that graph the maximum number of allowable collaboration failures in each collaboration "A" through "Z" over the time interval $T_0$ through $T_n$.

Recall that a collaboration is a group of KPIs used to measure a business process. Thus, collaboration "A" might be comprised of a set of KPIs that each represent receiving raw materials from suppliers; collaboration "B" might represent some processing that must be performed on those raw materials before they are ready to be used in a production process; and so forth. Or, in a networking environment, the collaborations might be structured such that one represents processing of a particular type of request message, while another represents processing of a different type of request message—where each collaboration may have a different failure tolerance in terms of these request-type-specific groupings of KPIs. (Determining which KPIs should form each collaboration, and determining which collaborations should form each service offering, is implementation-specific and may vary widely in environments in which the present invention is used advantageously.)

Figure 6B:
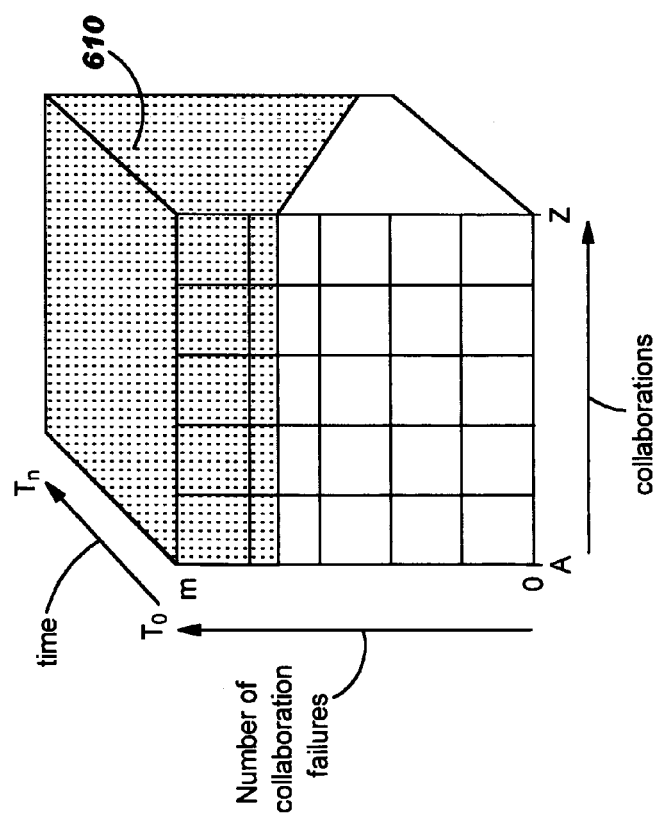
Figure 6C:
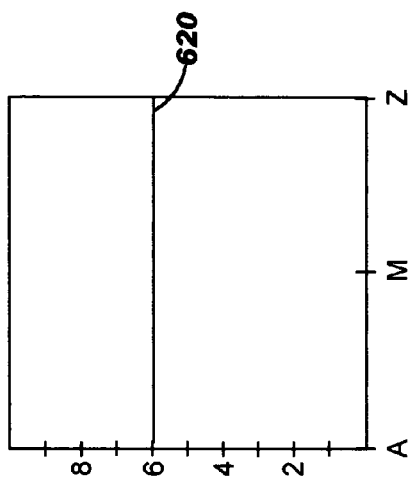
Figure 6D:
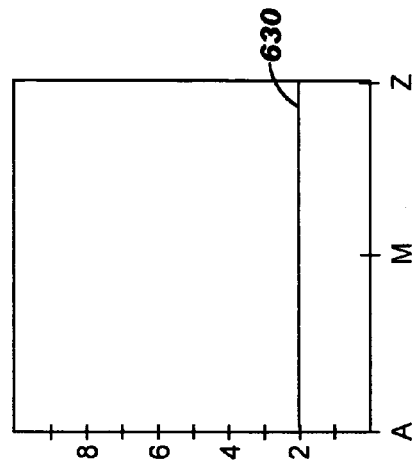

In FIG. 6B, the second-tier cube from FIG. 6A is shown with a reference cube interposed. For purposes of illustration, dark shading has been used at reference number 610 in FIG. 6B to show how the reference cube intersects, or aligns with, the second-tier cube from FIG. 6A. FIGS. 6C and 6D provide sample planes to further illustrate the sample reference cube. As shown at reference number 620 in FIG. 6C, at some time $T_j$, a fairly high number of failures are tolerated: in this example, 6 failures are tolerated in each collaboration. (Sample values are provided on the y-axis in FIGS. 6C and 6D merely for reference.) FIG. 6D represents a later time $T_k$, and as shown at reference number 630 in FIG. 6D, the number of failures that are tolerated at this later time is significantly less (2 for each collaboration, in this example) than are tolerated at time $T_j$. It should be noted that while the sample reference planes shown in FIGS. 6C and 6D have a horizontal line 620, 630 that illustrates uniform tolerance levels across all collaborations, this is merely an example. An actual reference cube may be comprised of planes where the tolerance varies from one collaboration to another. Thus, a line string or a collection of points may form an alternative plane for the (x,y) axes. Furthermore, more than one reference cube may be defined, where each such cube is constructed with reference to a different service offering. That is, one reference cube specifying tolerance values for platinum level customers might be interposed over the set of collaborations in the second-tier cube in FIG. 6A when drilling down from a platinum level service offering of the first-tier cube, and if a gold level service offering is also defined for those collaborations, then a different reference cube specifying different tolerance values may be interposed on the second-level cube of FIG. 6A when drilling down from the gold level in the first-tier cube.

Figure 7A:
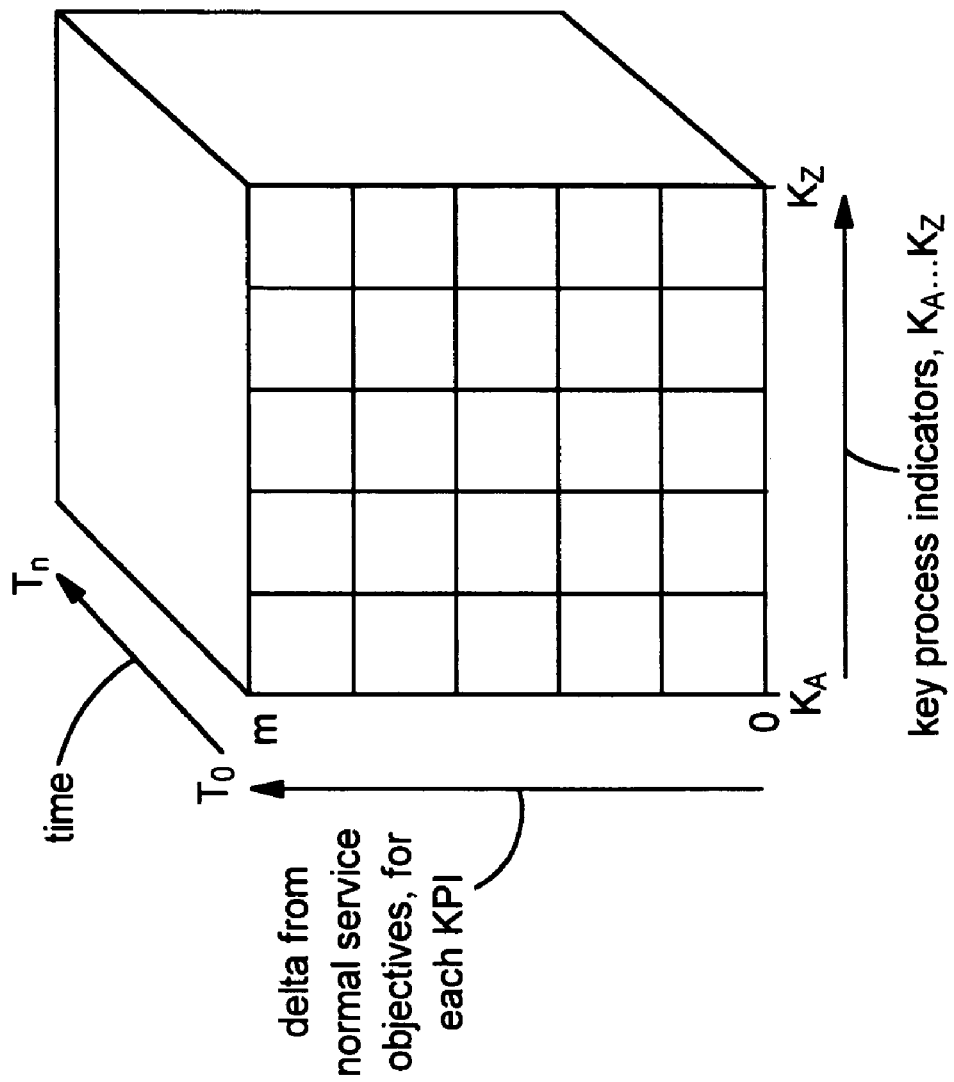
FIGS. 7A-7F, illustrates two sample "third-tier" cubes, interrelationships with sample reference cubes, and sample planes.
Figure 7B:
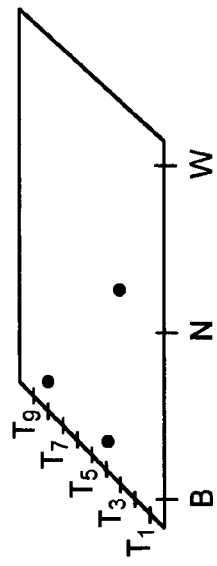
Figure 7D:
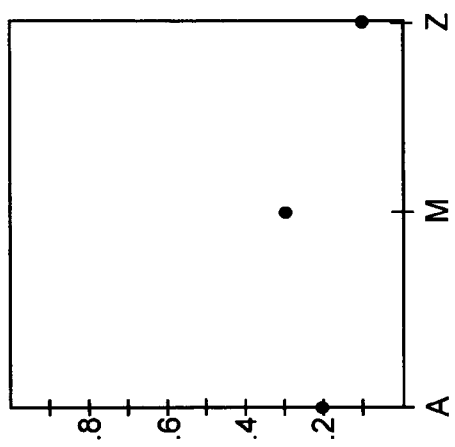
Figure 7C:
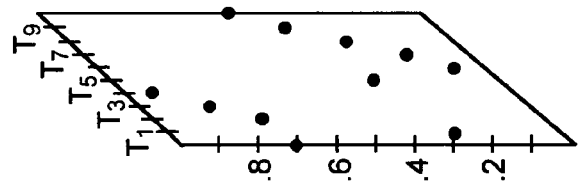
Figure 7E:
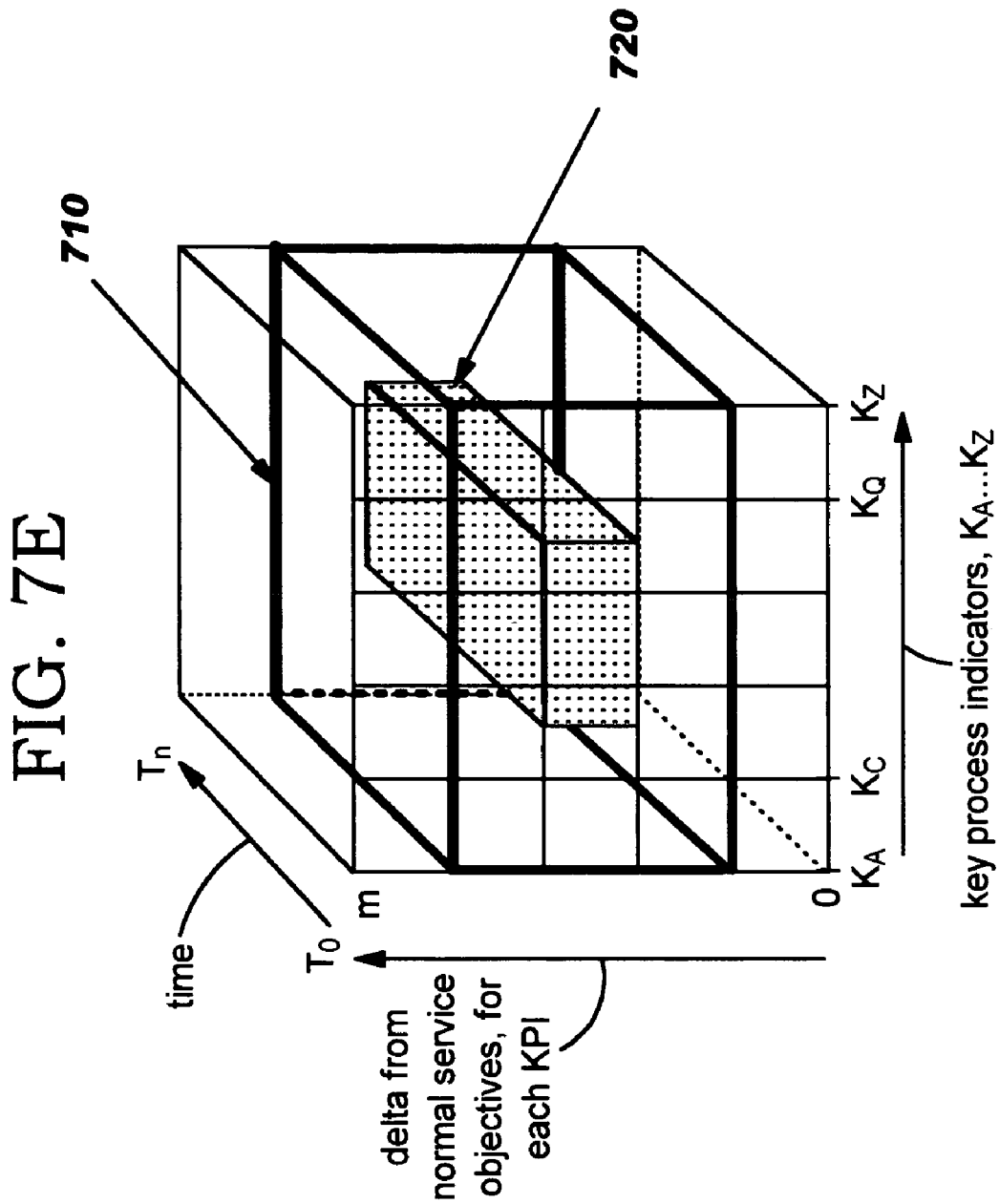
Figure 7F:
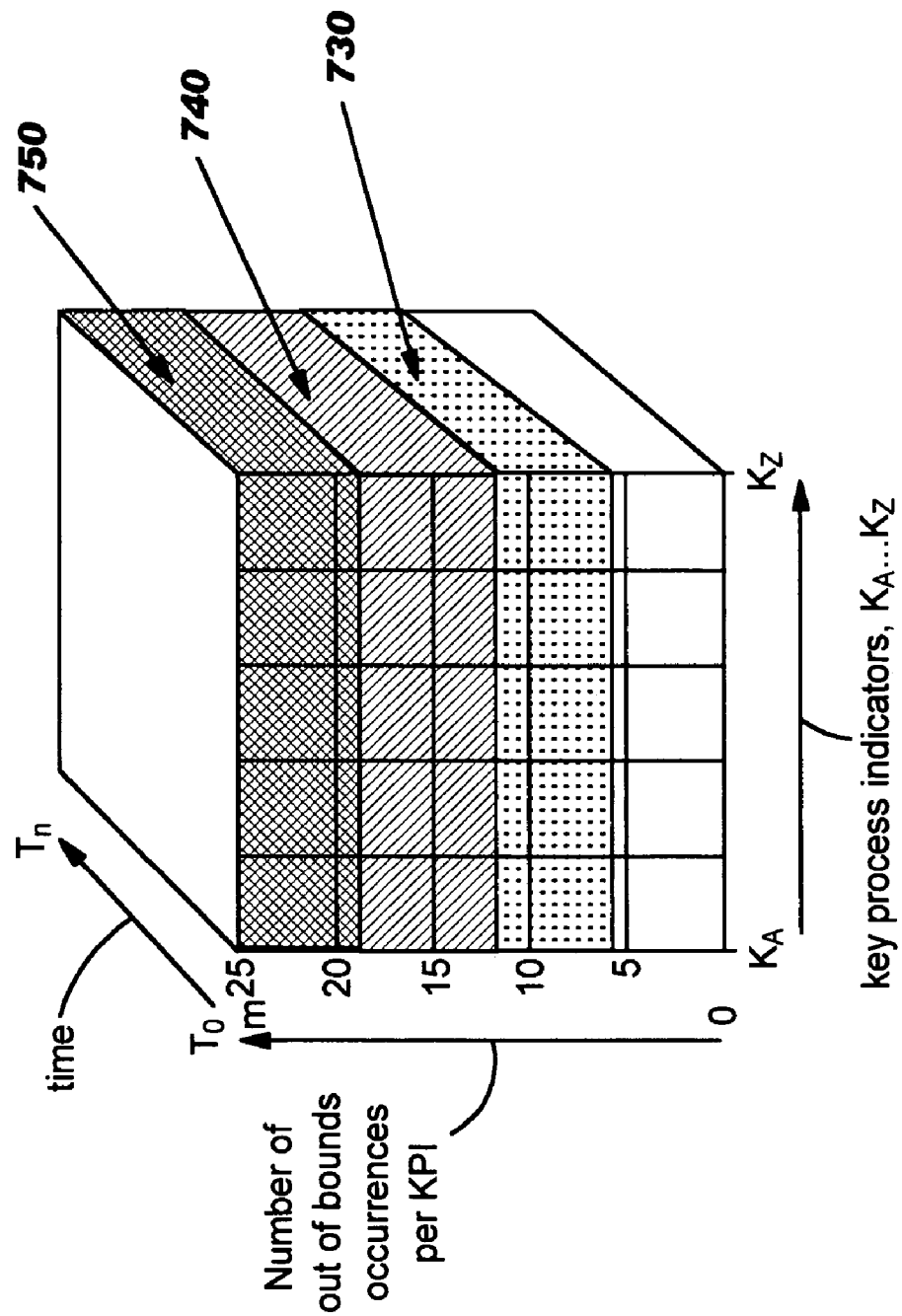

One or more third-tier cubes may be constructed, and each such cube represents a lower-level of detail (as contrasted to the cubes in FIGS. 5 and 6) where KPIs can be evaluated. Typically, a third-tier cube is constructed during a drill-down process when more information is desired pertaining to one of the collaborations represented in a second-tier cube, as discussed earlier. FIG. 7A shows one third-tier cube that might be constructed during drill-down, and FIG. 7F shows an alternative third-tier cube where different comparisons are drawn. FIGS. 7B-7D illustrate sample planes from the cube in FIG. 7A. FIG. 7E shows an example where two reference objects are compared to the third-tier cube from FIG. 7A.

For the third-tier cube in FIG. 7A, each plane graphs the currently-applicable KPIs (e.g., the KPIs pertaining to the collaboration selected for drilling down) on the x-axis and the y-axis graphs the deviation, or delta, from the normal service objective for each of these KPIs. (The cube is constructed from a collection of these planes, over a time interval $T_0$ to $T_n$, as with the first- and second-tier cubes.)

FIG. 7B shows a sample plane representing the per-KPI deviations at a time $T_m$. Note that the objective for each of the KPIs will often be a different value, and within a collection of KPIs that forms a particular collaboration, many different units of measure might be used. For example, one KPI's objective might be "less than 2 minutes" while another KPI's objective is "less than 5 days", and yet another KPI might be measured in terms of something other than time (such as less than 3 percent defective widget components). Therefore, preferred embodiments graph the per-KPI deviations using percentage values. As shown in FIG. 7B, KPI "A" deviates by 20 percent from its objective, KPI "M" from its objective by 30 percent, and KPI "Z" from its objective by 10 percent at time $T_m$. This sample plane is intended for illustration only, and it may be preferable, in some implementations, to use a y-axis scale using other units, such as a scale ranging between −1.0 and 1.0 (instead of 0.0 and 1.0, as shown in the example).

The third-tier cube in FIG. 7A can therefore be analyzed to determine deviations from objectives at a point in time as well as trends, over time, in these deviations. One of the (x,y) planes, as illustrated by FIG. 7B, may be used for the point-in-time analysis of a collection of KPIs (as discussed above). FIG. 7C shows an alternative plane, as a vertical slice along the (y,z) axes of the third-tier cube, that may be used to evaluate trends for a selected KPI (i.e., a selected value from the x-axis) over time. Suppose this plane corresponds to KPI "A". FIG. 7C shows that KPI "A" deviated, in this sample, from its objectives at each time interval $T_0$ through $T_n$. (Obviously, there may be cases where the objective was met, and in this case, a point may be placed directly on the z axis to indicate a (y,z) value of $(0,T_x)$.) Yet another alternative plane is illustrated in FIG. 7D, representing a horizontal slice along the (x,z) axes of the third-tier cube, for some particular deviation value (i.e., for some value from the y-axis). Suppose that this plane corresponds to 0.20 on the y-axis. The plane then has points for each of the KPIs that deviated from its objective by 20 percent over the time interval $T_0$ to $T_n$. For purposes of illustration, FIG. 7D shows that KPI "B" had this deviation at time $T_4$ and $T_8$; KPI "N" had this deviation at time $T_3$; and, by absence of a point from KPI "W", indicates that KPI "W" did not deviate from its objective by 20 percent at any time during time interval $T_0$ to $T_n$. (Sample values are presented in the planes of FIGS. 7B-7D merely for illustrative purposes, and have been selected at random.)

In FIG. 7E, a reference object 710 for a first service level and a reference object 720 for a second service level are shown as being mapped against the third-tier cube from FIG. 7A. Each reference object 710, 720 is typically associated with a different service level for which the per-KPI SLA commitments are to be evaluated. In this example, reference object 710 corresponds generally to a range or band of deviations, across all KPIs and all time intervals, that extends from a 20 percent deviation at the lower bound to an 80 percent deviation at the upper bound. So for example, this reference object 710 is concerned with determining whether any of the KPIs had deviations within this 20 percent to 80 percent range during the entire measurement interval $T_0$ to $T_n$.

Use of two reference objects in FIG. 7E is primarily for illustrative purposes. When using a drill-down approach, a single service offering has typically been selected from the first-tier cube, and a single collaboration has typically been selected from the second-tier cube, before arriving at the third-tier cube. In alternative embodiments, comparisons to other service levels and/or other collaborations might be performed after drilling down. That is, if drilling down from the platinum service level to the KPIs within one of the collaborations for that service level, it may useful to evaluate not only how the KPIs compared to their objectives for platinum-level customers, but also how the KPIs for these customers compared to objectives of one or more other service levels. Suppose, for example, that the objectives for the KPIs for platinum-level customers were not met. It may be useful to determine whether the same KPI values that were measured would have met the objectives for gold-level customers, or for silver-level customers, and so forth. The service provider might perform this comparison to determine how much of a fee reduction is owed to the platinum-level customers, for example. Similarly, multiple reference objects may be used when drilling down to a second-tier cube.

Reference object 720 corresponds, in the example of FIG. 7E to a subset of the KPIs, measured across all time intervals, and corresponds generally to a range of deviations that extends from a 40 percent deviation at the lower bound to a 60 percent deviation at the upper bound. So, for example, this reference object 720 is concerned with determining whether KPIs "C" through "Q" had deviations within this 40 percent to 60 percent range during time interval $T_0$ to $T_n$. Many other reference objects might be used alternatively, and although the sample reference objects 710, 720 encompass the entire time interval $T_0$ to $T_n$, other reference objects might be directed toward a subset of this time interval.

FIG. 7F shows a different third-tier cube where the KPIs are mapped against the number of "out-of-bound" occurrences, for each KPI, that were experienced during the time interval $T_0$ to $T_n$. This third-tier cube illustrates information that may be complementary to the information in the third-tier cube of FIG. 7A. In the example in FIG. 7F, the y-axis is shown (for illustration only) as having values between 0 and m=25. An (x,y) plane from this cube (not shown) therefore indicates, at some selected point in time $T_x$, how many times each of the KPIs was out of bounds.

Three different reference objects 730, 740, 750 are illustrated in FIG. 7F, where each reference object typically corresponds to a different service level. (As discussed with reference to FIG. 7E, the reference object for a single service level at a time will typically be evaluated when using a drill-down approach, although in alternative embodiments, a reference object for another service level may also be evaluated against the same drill-down cube if desired.) Thus, in this example, a first service level is represented by reference object 730, where this reference object indicates that the number of out-of-bounds occurrences should only be between 6 and 12 at any point in time, for any KPI. A second service level is represented by reference object 740, and indicates that more out-of-bounds occurrences are tolerated here than for the service level corresponding to reference object 730. In the figure, reference object 740 is shown as corresponding to a range between 12 and 19 out-of-bounds occurrences. Finally, reference object 750 represents a third service level, and this third service level tolerates (according to reference object 750) 19 to 25 out-of-bound occurrences at any time $T_x$. (Accordingly, the service level corresponding to reference object 730 will typically be more expensive for customers than the service level corresponding to reference object 740, and the service level corresponding to reference object 750 would typically be still lower-priced than either of the other two service levels.)

Business process evaluation engines or techniques of the prior art preferably gather data pertaining to measurements and store that data in association with particular points in time (or short intervals of time). Periodically, this stored data is used in combination with the mappings described above with reference to collections 1-3 and the SLA commitments in collections 4-6 to compute deviations at each of one or more points in time (and these deviations have been shown as being graphed on the y-axis of the cubes). Preferably, the cubes constructed during a drill-down operation all pertain to the same time interval. It should also be noted that while preferred embodiments are discussed with reference to building and analyzing geospatial cubes, techniques disclosed herein may also be used advantageously with other geometric data types, such as a 2-dimensional spatially-enabled plane, a line segment, a point, and so forth. References to building, analyzing, or otherwise processing cubes are therefore illustrative but not limiting of the scope of the present invention.

The building of the cubes may be triggered in several ways, without deviating from the scope of the present invention. As one example, an administrator might invoke an analysis function to check recent system performance and/or to predict future system performance, where this analysis function builds and evaluates cubes according to preferred embodiments of the present invention. As another example, invocation of the cube-building function might be timer-driven, whereby the building is performed at regularly-scheduled points in time. Or, as yet another example, an event-driven approach might be used, whereby (for example) one or more threshold values are set, and the cube-building function is invoked when any of these thresholds is exceeded. Optionally, the scheduled times used in a timer-driven approach and the events and threshold values in an event-driven approach may be configurable.

Preferably, when the cubes are used to autonomically adjust an operational system, the cubes are evaluated within a relatively short time after being constructed, thereby realizing maximal benefits from the now-historical data which they represent. (That is, when information about recent system performance is analyzed and used to adjust a system with a goal of improved system operation, it is preferable to analyze that information quickly and make adjustments relatively quickly, so that the adjustments provide a timely response.) It should be noted, however, that embodiments of the present invention are not limited to use with autonomic computing or autonomic system adjustments: the cubes created according to preferred embodiments may be analyzed after-the-fact for other reasons, including a study of operational trends, customer billing that is SLA-dependent, resource planning, and so forth.

Embodiments of the present invention preferably also allow the reference objects to be reconstructed when necessary. For example, a service provider might decide to add an additional level of service, requiring the boundary values for one or more existing service levels to be adjusted. Or, the boundary values in an existing service level might be individually adjusted (due, for example, to competitive pressures). In these examples, a new reference object is created (or an existing reference object is modified) to reflect the revised boundary values.

As has been stated above, functionality of a spatially-enabled database system is preferably used when evaluating the cubes and the data they represent. For example, a plane from a cube (at any of the previously-discussed tiers) may be compared to a corresponding plane from a reference object using polygon-based functions from a spatially-enabled database system. One manner in which the building and analyzing of cubes of the present invention may be carried out will now be described with reference to the flowcharts in FIG. 8.

Figure 8A:
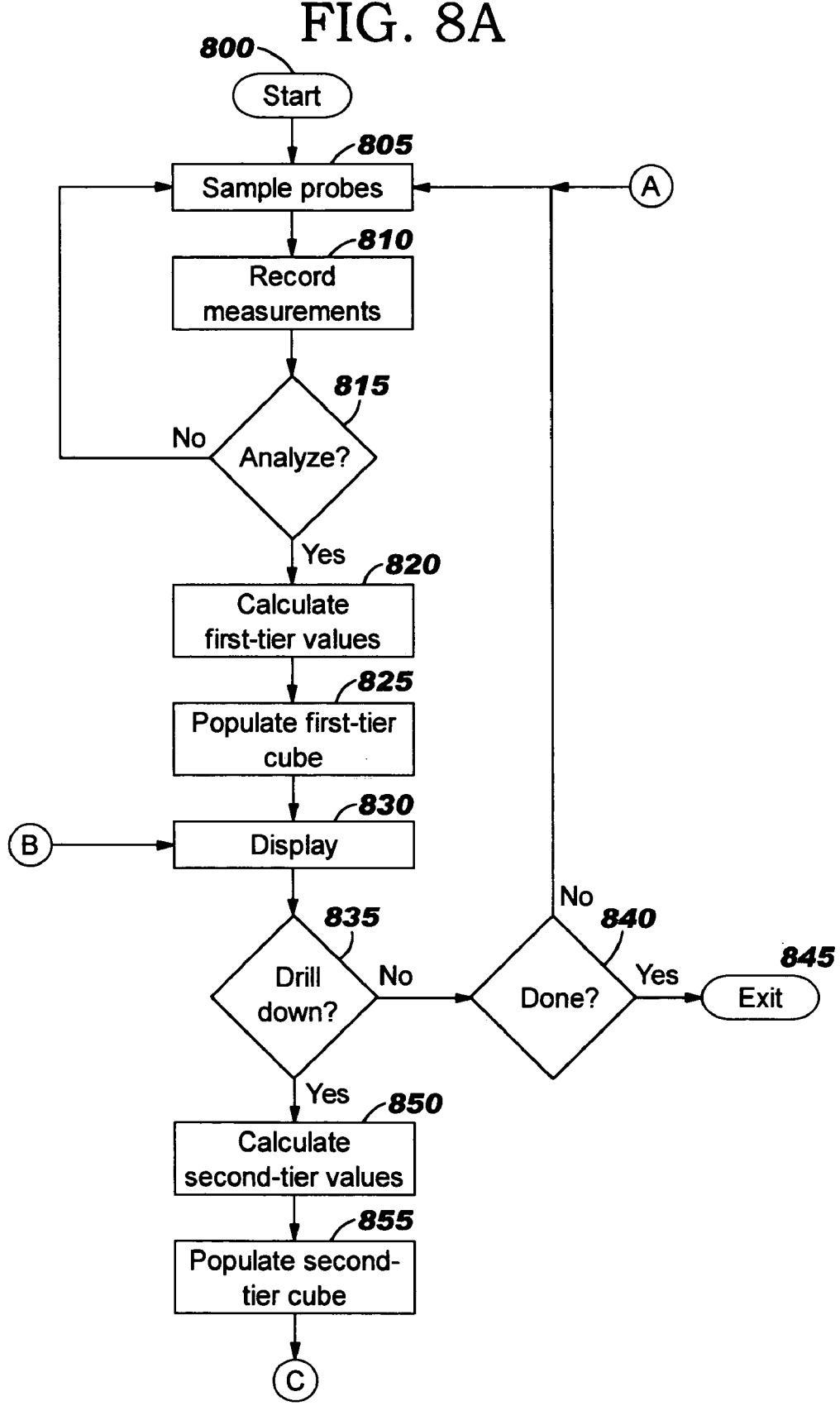
FIG. 8 (comprising FIGS. 8A-8B) provides a flowchart depicting logic that may be used when implementing embodiments of the present invention.
Figure 8B:
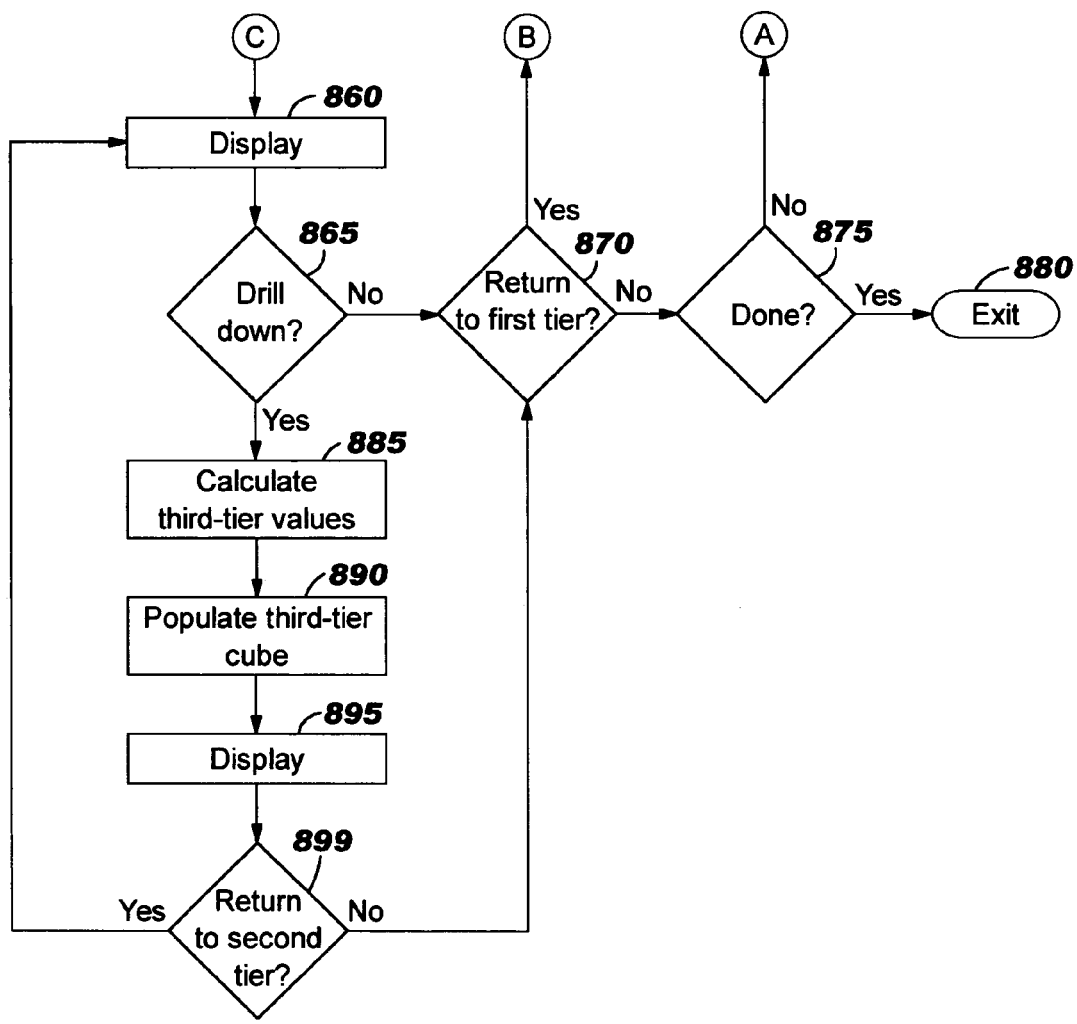

The processing of FIG. 8 begins (Block 800) and a set of predetermined probes is sampled (Block 805). Measurements taken by the probes are recorded (Block 810). In preferred embodiments, the probe-to-KPI mappings in collection 1 are used to determine which of the KPIs each probe's measurements pertain to. (Preferably, KPI values are not summed or otherwise aggregated for collaborations, and collaboration values are not summed or otherwise aggregated for service offerings, until the corresponding cubes are created.) Block 815 tests to see whether the gathered measurement data should now be analyzed. (As stated earlier, a timer-driven or event-driven approach may be used, including providing an administrator with an invocable function that drives the analysis process.)

When the test in Block 815 has a negative result, control preferably returns to Block 805 to continue sampling probes and recording the measured data. Otherwise, processing continues at Block 820. In the drill-down approach of preferred embodiments, the analysis begins with the first-tier cube corresponding to service offerings, and Block 820 therefore retrieves appropriate first-tier values, which may have been calculated previously and stored, or which may be calculated anew during the processing of Block 820. (As stated earlier, a service offering is defined as a collection of collaborations, and each collaboration is defined as a collection of KPIs. Collections 3, 2, and 1, respectively, are preferably used to locate the proper mappings in each case. Thus, the data that pertains to each service offering is preferably determined by processing the data for each of the collaborations in that service offering, which in turn requires processing the data for each KPI in each of those collaborations.)

The drill-down approach represented in FIG. 8 may by used as an efficient filter or sieve that locates potential problem areas at a high level, and then obtains additional information that may be used to further investigate those potential problem areas. In this manner, the computational overhead required for populating the second-tier and third-tier geospatial cubes may be avoided unless those cubes are deemed necessary for the further investigation.

Block 825 then populates a first-tier cube from the values obtained in Block 820, and in Block 830, this first-tier cube is displayed. One or more aspects of this first-tier cube are then evaluated, for example by a human user or a programmatic process. Based on this evaluation, in Block 835, a decision is made as to whether it is desirable to drill down for further detail—i.e., to see the collaborations for a selected service offering. For example, a selected one of the service offerings may have gone out of bounds of its SLA commitments (as may be determined with reference to SLA information stored in collection 6), and it may be desirable to drill down to the collaborations to see where problems may have arisen. Other heuristics may be evaluated as well. As one example, failure behavior at selected intervals may be evaluated for each of the service offerings, and if an undesirable trend is found, it may be desirable to drill down for further analysis. As another approach, each SO may be evaluated in turn by drilling down into its collaborations. If the test in Block 835 has a negative result, then Block 840 checks to see if analysis of the system is finished. If so, then processing of FIG. 8 exits (Block 845); otherwise, control returns to Block 805 to continue sampling probes for the system.

Control reaches Block 850 when a decision has been made to drill down for a selected service offering. Block 850 indicates that the second-tier values (i.e., the collaboration values) are retrieved, and the second-tier cube is populated (Block 855) and displayed (Block 860). Note that when using a drill-down approach, the collaborations pertain to the SO from which the drill-down was requested, as may be determined by the mappings in collection 3.

After analyzing the second-tier cube, a decision is made at Block 865 as to whether it is desirable to drill down for further detail—i.e., to see the KPIs for a selected collaboration. (A collaboration may have gone out of bounds of its SLA commitments, for example, as may be determined with reference to SLA information stored in collection 5. Or, other factors may motivate a desire to drill down to a collaboration's KPIs.) If not, then Block 870 checks to see if it is desirable to return back to the first-tier cube (e.g., to study a different service offering). If so, then control returns to Block 830 to re-display the first-tier cube. Otherwise, Block 875 tests whether analysis of the system is finished. If the test in Block 875 has a positive result, then processing of FIG. 8 exits (Block 880); otherwise, control returns to Block 805 to continue sampling probes for the system.

Control reaches Block 885 when a decision has been made to drill down within a selected collaboration. Block 885 indicates that the third-tier values (i.e., the KPI values) are retrieved, and the third-tier cube is populated (Block 890) and displayed (Block 895). When using a drill-down approach, the KPIs of interest are those pertaining to the collaboration from which the drill-down was requested, as may be determined by the mappings in collection 2.

As illustrated by the y-axis scales in the sample third-tier cubes in FIGS. 7A and 7F, there may be different types of third-tier analysis to be performed, and thus there may be multiple third-tier cubes that can be constructed. (Multiple second-tier cubes may also be provided, although this has not been illustrated in the examples herein.) In one approach, a particular one of these third-tier cubes can be selected from the display of the second-tier cube (e.g., by placing graphical buttons on the second-tier display, each representing a different type of third-tier analysis). The subsequent discussion of processing at the third tier applies equally to these different types of third-tier cubes.

After analyzing the displayed third-tier cube, a decision is made at Block 899 as to whether it is desirable to return back to the second-tier cube (e.g., to study a different collaboration). If so, then control returns to Block 860 to re-display the second-tier cube. Otherwise, control returns to Block 870, which has been described above, to determine how to proceed.

When calculating values for KPIs, the tables previously referred to as "collections 1 and 4" are preferably used to determine whether SLA commitments for each KPI were met. When there are multiple service levels, then a different SLA commitment may exist for the KPIs (as has been discussed). Preferably, the corresponding measurement and/or deviation from each SLA commitment, for each KPI, is persisted (at least temporarily). Similarly, when calculating values for collaborations, the tables previously referred to as "collections 2 and 5" are preferably used to determine whether SLA commitments for each collaboration were met, and when calculating values for service offerings, the tables previously referred to as "collections 3 and 6" are preferably used to determine whether SLA commitments for each service offering were met. In addition, the deviations and/or measurements corresponding to each collaboration and each service offering are preferably persisted (at least temporarily).

Optionally, means may be provided whereby the probing (i.e., measurement-taking) can be increased. For example, if a particular service offering is failing to meet its commitments, it may be desirable to increase the frequency of sampling and/or the number of probes that are collecting measurement data. With reference to the probes in FIG. 3, for example, suppose that retailer "R1" has contracted for gold level service, which includes an upper bound on delivery time for an order of widgets, and that this upper bound has been exceeded. If a probe is not already in place for measuring the delivery time from assembler "A3" to retailer "R1", it may be desirable to define an additional probe for this link in order to further analyze why the delivery time constraints are being exceeded. A user-initiated means may be provided for changing the probing, and/or automated means may be provided (where, e.g., predetermined changes are made when a predetermined triggering value, such as deviating from an objective by more than "X" percent, is reached.)

An embodiment of the present invention may alternatively or additionally allow for bottom-up processing instead of the drill-down processing that has been described thus far. So, for example, measurements for the KPIs may be created and summed/aggregated, and one or more third-tier cubes may be presented to represent this data. An upwards progression can then be made, if desired, to view data pertaining to a collaboration including selected KPIs and/or a service offering that includes selected collaborations. In this bottom-up approach, it may be desirable to provide the user with a table or other legend that reflects the mapping to the next-higher level; enabling the user to select an entry from this table or legend will typically be easier than requiring the user to individually select an appropriate group of elements from the currently-viewed level.

As has been demonstrated, the present invention provides novel techniques that evaluate business processes in an efficient manner, where the evaluation can be performed in real time and if desired, can then be used to as input for autonomic adjustments of the monitored system(s). A number of examples have been provided, although it is to be understood that these examples are by way of illustration and not of limitation.

The term "iceberg cubes" is used in the art with reference to data marts. Cubes used for data marts are typically complex structures having many dimensions. The cubes used in preferred embodiments of the present invention, by contrast, are defined as spatial objects with only three dimensions. A very regular structure can therefore be used for these cubes, and as a result, computations using the cubes are considerably simpler than what is required for non-regular spatial objects. (While the cube concept is known in the art, using cubes in the manner disclosed herein is not known in the art, to the best of the present inventors' knowledge and belief.)

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems), and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications may occur to those skilled in the art once they learn of the basic inventive concepts. Therefore, it is intended that the appended claims shall be construed to include the preferred embodiments and all such variations and modifications as fall within the spirit and scope of the invention.

What is claimed:

1. A method of using geospatial operations of a geospatially-enabled database system to analyze a service level management system ("SLMS"), comprising:

collecting, from each of a plurality of probes, a plurality of measurements pertaining to a plurality of service offerings of the SLMS, wherein each of the service offerings comprises a plurality of collaborations among processes of the SLMS, each of the collaborations comprises a plurality of key process indicators representing the processes of the SLMS, each of the key process indicators represents at least one of the processes of the SLMS, and each one of the probes is associated with a different one of the key process indicators;

programmatically constructing a geospatial cube from the collected measurements, wherein:

a first dimension of the geospatial cube comprises a first collection of planes, each of the planes in the first collection representing, for each of the service offerings of the SLMS and a particular time from among a plurality of times at which the measurements were collected, a service offering metric computed from the measurements collected at the particular time;

a second dimension of the geospatial cube comprises a second collection of planes, each of the planes in the second collection representing, for each of the service offerings of the SLMS and a particular value of the service offering metric, each of the plurality of times at which the measurements were collected and at which the particular value occurred for that service offering; and a third dimension of the geospatial cube comprises a third collection of planes, each of the planes in the third collection representing, for each of the plurality of times at which the measurements were collected and a particular one of the service offerings of the SLMS, the service offering metric computed from the measurements collected at that time for the particular one of the service offerings; and analyzing the processes of the SLMS by using the constructed cube as input to geospatial operations provided by the geospatially-enabled database system.

2. A system for using geospatial operations to analyze a service level management system ("SLMS"), comprising:

a geospatially-enabled database system stored on computer-usable storage;

means for collecting, from each of a plurality of probes a plurality of measurements pertaining to a plurality of service offerings of the SLMS, wherein each of the service offerings comprises a plurality of collaborations among processes of the SLMS, each of the collaborations comprises a plurality of key process indicators representing the processes of the SLMS, each of the key process indicators represents at least one of the processes of the SLMS, and each one of the probes is associated with a different one of the key process indicators;

means for programmatically constructing a geospatial cube from the collected measurements ,wherein:

a first dimension of the geospatial cube comprises a first collection of planes, each of the planes in the first collection representing, for each of the service offerings of the SLMS and a particular time from among a plurality of times at which the measurements were collected, a service offering metric computed from the measurements collected at the particular time;

a second dimension of the geospatial cube comprises a second collection of planes, each of the planes in the second collection representing, for each of the service offerings of the SLMS and a particular value of the service offering metric, each of the plurality of times at which the measurements were collected and at which the particular value occurred for that service offering; and a third dimension of the geospatial cube comprises a third collection of planes, each of the planes in the third collection representing, for each of the plurality of times at which the measurements were collected and a particular one of the service offerings of the SLMS, the service offering metric computed from the measurements collected at that time for the particular one of the service offerings; and means for analyzing the processes of the SLMS by using the constructed cube as input to geospatial operations, wherein the geospatial operations are provided by the geospatially-enabled database system.

3. The method according to claim 1, wherein the analyzing further comprises comparing the cube to a reference cube that represents allowable values for the service offering metric.

4. The method according to claim 1, wherein the service offering metric comprises meeting a service offering objective.

5. The method according to claim 1, wherein the service offering metric comprises failure to meet a service offering objective, and wherein the analyzing further comprises comparing the cube to a reference cube that represents allowable service offering failures for the service offering metric.

6. The method according to claim 1, wherein the analyzing further comprises invoking at least one of the geospatial operations to drill down from the cube to a particular one of the planes in the first, second, or third collection to obtain information about the plurality of collaborations.

7. The method according to claim 6, further comprising invoking at least one of the geospatial operations to drill down from the particular one of the planes to obtain information about the plurality of key process indicators.

8. A computer program product for using geospatial operations of a geospatially-enabled database system to analyze a service level management system ("SLMS"), the computer program product embodied on one or more computer-usable storage media and comprising:

computer-usable program code for collecting, from each of a plurality of probes, a plurality of measurements pertaining to a plurality of service offerings of the SLMS, wherein each of the service offerings comprises a plurality of collaborations among processes of the SLMS, each of the collaborations comprises a plurality of key process indicators representing the processes of the SLMS, each of the key process indicators represents at least one of the processes of the SLMS, and each one of the probes is associated with a different one of the key process indicators;

computer-usable program code for constructing a geospatial cube from the collected measurements, wherein:

a first dimension of the geospatial cube comprises a first collection of planes, each of the planes in the first collection representing, for each of the service offerings of the SLMS and a particular time from among a plurality of times at which the measurements were collected, a service offering metric computed from the measurements collected at the particular time;

a second dimension of the geospatial cube comprises a second collection of planes, each of the planes in the second collection representing, for each of the service offerings of the SLMS and a particular value of the service offering metric, each of the plurality of times at which the measurements were collected and at which the particular value occurred for that service offering; and a third dimension of the geospatial cube comprises a third collection of planes, each of the planes in the third collection representing, for each of the plurality of times at which the measurements were collected and a particular one of the service offerings of the SLMS, the service offering metric computed from the measurements collected at that time for the particular one of the service offerings; and computer-usable program code for analyzing the processes of the SLMS by using the constructed cube as input to geospatial operations provided by the geospatially-enabled database system.

9. The computer program product according to claim 8, wherein the analyzing further comprises comparing the cube to a reference cube that represents allowable values for the service offering metric.

10. The computer program product according to claim 8, wherein the service offering metric comprises meeting a service offering objective.

11. The computer program product according to claim 8, wherein the service offering metric comprises failure to meet a service offering objective, and wherein the analyzing further comprises comparing the cube to a reference cube that represents allowable service offering failures for the service offering metric.

12. The computer program product according to claim 8, wherein the analyzing further comprises invoking at least one of the geospatial operations to drill down from the cube to a particular one of the planes in the first, second, or third collection to obtain information about the plurality of collaborations.

13. The computer program product according to claim 12, further comprising invoking at least one of the geospatial operations to drill down from the particular one of the planes to obtain information about the plurality of key process indicators.

* * * * *